United States Patent

[11] 3,609,162

| [72] | Inventors | Emmett H. Burk, Jr.<br>Glenwood, Ill.;<br>Donald D. Carlos, Crown Point, Ind. |
|---|---|---|
| [21] | Appl. No. | 781,586 |
| [22] | Filed | Dec. 5, 1968 |
| [45] | Patented | Sept. 28, 1971 |
| [73] | Assignee | Atlantic Richfield Company<br>New York, N.Y.<br>Continuation-in-part of application Ser. No. 651,380, July 6, 1967, now abandoned, which is a continuation-in-part of application Ser. No. 502,328, Oct. 22, 1965, now abandoned. |

[54] CYCLOALIPHATIC MONO (NITRILE CARBONATES)
13 Claims, No Drawings

[52] U.S. Cl. .................................................. 260/307,
260/453, 260/500.5
[51] Int. Cl. ........................................................ C07d 85/06
[50] Field of Search .......................................... 260/307.1

[56] References Cited
UNITED STATES PATENTS

| 2,448,767 | 9/1948 | Carlson | 260/327 |
| 2,587,641 | 3/1952 | Moersch et al. | 260/327 |
| 2,882,275 | 4/1959 | Meiser et al. | 260/327 |
| 3,053,852 | 9/1962 | Coover et al. | 260/327 |
| 3,086,024 | 4/1963 | Braun et al. | 260/327 |

*Primary Examiner*—Alex Mazel
*Assistant Examiner*—R. J. Gallagher
*Attorneys*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland ABSTRACT: The disclosure is of compounds of the formula

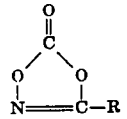

wherein R is a cycloaliphatic radical. The synthesis can be performed by reacting the corresponding hydroxamic acids with phosgene. The compounds can be decomposed to yield the corresponding cycloaliphatic monoisocyanates.

CYCLOALIPHATIC MONO (NITRILE CARBONATES)

This application is a continuation-in-part of abandoned application Ser. No. 651,380, filed July 6, 1967, which latter application is, in turn, a continuation-in-part of abandoned application Ser. No. 502,328, filed Oct. 22, 1965.

The present invention is directed to a new class of organic compounds. More specifically, the invention is directed to cycloaliphatic mono(nitrile carbonates) which can be represented by the following structure:

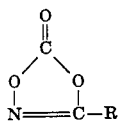

wherein R is a cycloaliphatic hydrocarbon of 5 to about 30, or even about 50, carbon atoms, preferably 5 to about 15 carbon atoms. The cycloaliphatic hydrocarbon R can be saturated or ethylenically or acetylenically unsaturated and is preferably cycloalkyl. Where R is polycyclic, the rings can be formed by either a bridged ring system or a spiro ring system, or both. Most often, R will be either monocyclic or will possess only a bridged ring system, as, for example, in decalin. If desired, R can contain ring substituents such as, for instance, one or more, say 1 to 3, halo (preferably chloro, bromo or fluoro), nitro, alkyl or alkoxy groups, which alkyl and alkoxy groups contain 1 to about 20, preferably 1 to about 10, carbon atoms. Since a highly advantageous property of the compounds of the invention is that they can be thermally decomposed to monoisocyanates (RNCO), the R group in the above structure contains no hydrogen reactive with isocyanate.

The cycloaliphatic mono(nitrile carbonates) of the present invention are valuable intermediates or precursors for the preparation of highly desired chemicals. For example, as mentioned above the cycloaliphatic mono(nitrile carbonates) can be thermally decomposed to monoisocyanates. Monoisocyanates can be used in the preparation of urethanes, ureido compounds, and other derivatives of various active hydrogen-containing compounds. The cycloaliphatic mono(nitrile carbonates) can also be hydrolyzed with basic materials to the respective amines or acid hydrolyzed to cycloaliphatic hydroxamic acids.

Decomposition of the cycloaliphatic mono(nitrile carbonates) to the corresponding cycloaliphatic monoisocyanates can be effected by heating the cycloaliphatic mono(nitrile carbonate) to a temperature below the degradation point of the desired cycloaliphatic monoisocyanate product. Since the decomposition reaction is exothermic there may be a tendency for the reaction temperature to run away. Means for carrying away or absorbing heat may be used, therefore, to control the temperature below the degradation point of the desired cycloaliphatic monoisocyanate product. The temperature employed will vary, of course, depending upon the decomposition temperature of the feed and degradation temperature of the particular cycloaliphatic monoisocyanates being prepared. In most cases, however, the temperature will usually fall in the range of about 50° to 200° C., preferably about 75° to 150° C.

The ability of the cycloaliphatic mono(nitrile carbonates) of the invention to generate monoisocyanates upon heating provides an additional advantage in that the cycloaliphatic mono(nitrile carbonates) of the invention, in contrast to isocyanates, are stable in the absence of water and therefore can be easily handled and stored. Also, since there is no active hydrogen (e.g. in the form of HCl) present in the cycloaliphatic mono(nitrile carbonates) of the invention or in the decomposition products formed, to react with the isocyanate when the latter is made, use of the cycloaliphatic mono(nitrile carbonates) for the production of monoisocyanates provides a method that does not suffer from the reduced yields and separation and purification problems presented by the byproducts obtained from starting materials of commercial methods wherein active hydrogen is present. Use of the cycloaliphatic mono(nitrile carbonates) in the preparation of isocyanates, furthermore, provides a process having advantages over commercial methods employing azides in that the former do not have the explosion tendencies of the latter and are more economical.

The cycloaliphatic mono(nitrile carbonates) of the invention can be prepared by reacting a cycloaliphatic monohydroxamic acid and phosgene. Cycloaliphatic monohydroxamic acids which react with phosgene to produce the novel compounds of the invention can be represented by the structure:

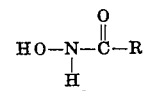

wherein R is as defined above in the structure of the cycloaliphatic mono(nitrile carbonates) of the invention.

Illustrative of cycloaliphatic monohydroxamic acids suitable for use as the reactant in the preparation of the cycloaliphatic mono(nitrile carbonates) of the invention are the following: monocycloaliphatic hydroxamic acids, such as cyclopentylhydroxamic acid, cyclohexylhydroxamic acid, 3-methyl cycloheptylhydroxamic acid, 3-isopentyl cyclooctylhydroxamic acid, 4-octyl cyclodecylhydroxamix acid, 4-methoxy-2-cyclopentenylhydroxamic acid, 4-cyclohexenyl-hydroxamic acid, 5-pentadecyl-3-cycloheptenylhydroxamic acid, 3-nitro-4cycloctenylhydroxamic acid, 4-chloro-3-cyclodencenylhydroxamic acid, 5-bromo-10-cycloheptadecenylhydroxamic acid, 2,4cyclopentadienylhydroxamic acid, 2,5-cyclohexadienylhydroxamic acid, 2,4,6-cycloheptatrienylhydroxamic acid, cyclooctotetraenylhydroxamic acid, etc.; polycycloaliphatic hydroxamic acids, for instance, of 2 to 5, preferably 2 or 3, hydrocarbon rings, such as, bicyclo [1.1.1] pent-2-ylhydroxamic acid, bicyclo [3.1.0] hex-3-yl-hydroxamic acid, 2-ethyl-bicyclo [2.2.1] hept-7-yl-hydroxamic acid, bicyclo [2.2.2] oct-2-yl-hydroxamic acid, bicyclo [2.2.1] hept-5-en-2-yl-hydroxamic acid, bicyclo [3.2.1] oct-2,4-dien-7-yl-hydroxamic acid, 1-perhydroanthracene-hydroxamic acid, 2-chloroperhydroanthracen-1-yl-hydroxamic acid, tricyclo [4.4.1.1$^{1,5}$] dodec-3-yl-hydroxamic acid, 5-dodecyl-tetracyclo [5.2.2.0.$^{3,8}$0$^{4,11}$] undec-2yl-hydroxamic acid, perhydro-1,4-ethanoanthracen-1-yl-hydroxamic acid, 6-tricosylperhydro-1,4-ethano-5,8-methanoanthracen-1-yl-hydroxamic acid, 3-perhydroperylene-hydroxamic acid, etc.

Illustrative examples of cycloaliphatic mono(nitrile carbonates) of the present invention include: cyclopentyl mono(nitrile carbonate), cyclodecyl mono(nitrile carbonate), cyclopentadecyl mono(nitrile carbonate), cycloheptadecyl mono(nitrile carbonate), cyclotetracosyl mono(nitrile carbonate), cyclooctacosyl mono(nitrile carbonate), cyclotriacontyl mono(nitrile carbonate), 2-methylcycloheptyl mono(nitrile carbonate), 4-fluoro-cyclohexyl mono(nitrile carbonate), 2-ethoxy-cyclooctyl mono(nitrile carbonate), 2-isopentoxy-cyclononyl mono(nitrile carbonate), 2-bromo-cyclodecyl mono(nitrile carbonate), α-decalin mono(nitrile carbonate), β-decalin mono(nitrile carbonate), 2-bromoheptalen-1-yl-mono(nitrile carbonate), 2-nitro-tetral-1-yl-mono(nitrile carbonate), 4-carene-mono(nitrile carbonate), 2-perhydroanthracene-mono(nitrile carbonate), 1,2-dimethyl-5-phenyl perhydrochrysen-3-yl-mono(nitrile carbonate), 2-perhydropentacene-mono(nitrile carbonate), etc.

The temperature for effecting the reaction of the cycloaliphatic monohydroxamic acid and phosgene may vary depending upon the particular cycloaliphatic hydroxamic acid selected but in all cases should be conducted below the decomposition temperature of the desired cycloaliphatic mono(nitrile carbonate). Reflux temperatures can also be used as long as the reflux temperature of the particular mixture is below the decomposition temperature of the corresponding cycloaliphatic mono(nitrile carbonate) produced.

The reaction temperature will usually fall in the range of up to about 90° C., often up to about 70° C., preferably up to about 30° C. The reaction can be successfully run at temperatures as low as about minus 30° C. Ordinarily the reaction will proceed readily at atmospheric pressure but sub- and superatmospheric pressure can be employed if desired. Either the cycloaliphatic hydroxamic acid reactant or the phosgene reactant can be in excess but it is preferred that at least a stoichiometric amount of phosgene be used, that is, a ratio of at least 1 mole of phosgene per hydroxamic acid substituent.

The reaction is conducted in the liquid phase and in many cases the cycloaliphatic monohydroxamic acid will react from the solid state. Advantageously, the cycloaliphatic monohydroxamic acid is first dissolved or slurried in an oxygen-containing organic solvent. Illustrative of suitable oxygen-containing solvents are the phosgene reactant itself and normally liquid organic ethers, esters, furans, dioxanes and the like.

The reaction is often over in less than about 0.5 hour, for example 15 minutes, or in about 5 to 20 hours, depending upon the reaction temperature employed and is marked by a cessation in hydrogen chloride gas evolution. Normally, at least about 0.5 hour is required for the reaction to go to completion at temperatures which minimize side reactions. The reaction is usually quite rapid once the cycloaliphatic monohydroxamic acid is dissolved. At the lower reaction temperatures the cycloaliphatic monohydroxamic acid is generally slow to dissolve and may even come out of solution, go back into solution, etc., during the reaction.

The cycloaliphatic mono(nitrile carbonate) can be recovered from the resulting solution by any desirable means, for instance, by first filtering the resulting solution to remove any unreacted starting materials and subjecting the filtrate to reduced pressure to remove unreacted phosgene and inert solvent, if employed, and provide the cycloaliphatic mono(nitrile carbonate) as a crude product. Alternatively, prior to the filtering step, the solution can be cooled to crystallize out the product and recovered as described. The crude product, which can be either crystalline or liquid depending on the particular cycloaliphatic mono(nitrile carbonate) prepared, contains small amounts of impurities high in chlorine content. A purer product, essentially chlorine-free, can be obtained by recrystallization techniques as, for instance, from a suitable solvent such as dichloromethane, carbon disulfide, ethyl acetate, phosgene, and the like, or mixtures thereof.

A convenient alternative method for obtaining an essentially chlorine-free cycloaliphatic mono(nitrile carbonate) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular cycloaliphatic mono(nitrile carbonate) feed selected. If desired, a combination of both the recrystallization and extraction methods can be used to obtain essentially chlorine-free cycloaliphatic mono(nitrile carbonate). Thermal decomposition of the essentially chlorine-free feed results in improved yields of a purer monoisocyanate product, which is also essentially chlorine-free.

The following examples will serve to illustrate the present invention but are not to be construed as limiting.

EXAMPLE I 14.3 g. (0.10 mole) of cyclohexylhydroxamic acid and 198 g. (2.0 moles) of phosgene and 200 cc. diethyl ether are added to a 500-cc. fluted, round-bottom pressure flask equipped with a reflux condenser attached to a CaCl₂ drying tube. The reaction mixture is stirred mechanically and heated at reflux for 2 hours. The resulting solution is filtered and the unreacted phosgene and ether are removed under reduced pressure to obtain cyclohexyl mono(nitrile carbonate) product containing small amounts of impurities. Recrystallization from dichloromethane gives chlorine-free cyclohexyl mono(nitrile carbonate).

EXAMPLE II

To a 300fluted, round-bottom pressure flask equipped with a reflux condenser attached to a CaCl₂ drying tube, are added 9.8 g. of β-decalin hydroxamic acid and 121 g. of phosgene. The reaction mixture is stirred mechanically and heated to reflux for 2 hours. The resulting solution is filtered and the phosgene removed under reduced pressure to obtain β-decalin mono(nitrile carbonate) product containing small amount of impurities. Recrystallization from dichloromethane gives chlorine-free β-decalin mono(nitrile carbonate).

EXAMPLES III–V

In accordance with the procedure of the above examples, 34.6 g. (0.20 moles) p-methoxycyclohexylhydroxamic acid is treated with 198 g. (2.0 moles) of phosgene for 3 hours at 0° C. There results a quantitative yield of p-methoxy cyclohexyl mono(nitrile carbonate). Similarly p-nitro-cyclohexyl mono(nitrile carbonate) can be made from 9.4 g. of p-nitro-cyclohexylhydroxamic acid and 99 g. of phosgene, and 2,4-dichlorocyclohexyl mono(nitrile carbonate) can be made from 10.4 g. of 2,4-dichlorocyclohexylhydroxamic acid and 99 g. of phosgene.

It is claimed:

1. Cyclic nitrile carbonate group-containing compound having the structure:

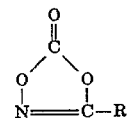

Wherein R has 5 to 30 carbon atoms and is selected from the group consisting of (A) cycloaliphatic hydrocarbon of 1 to 3 rings and (B) cycloaliphatic hydrocarbon of 1 to 3 rings which is ring-substituted with from 1 to 3 substituents selected from the group consisting of halo, nitro and alkoxy of 1 to 10 carbon atoms.

2. The compound of claim 1 wherein R has 5 to 15 carbon atoms.

3. The compound of claim 2 wherein R is saturated.

4. The compound of claim 2 wherein R is monocyclic.

5. The compound of claim 2 wherein R is decalyl.

6. β-decalin mono(nitrile carbonate).

7. The compound of claim 1 wherein R is cycloaliphatic hydrocarbon of 1 to 3 rings which is ring-substituted with from 1 to 3 substituents selected from the group consisting of halo, nitro and alkoxy of 1 to 10 carbon atoms.

8. The compound of claim 7 wherein R has 5 to 15 carbon atoms.

9. The compound of claim 8 wherein R is saturated.

10. The compound of claim 8 wherein R is monocyclic.

11. Para-methoxycyclohexyl mono(nitrile carbonate). 500-cc. round-bottom

12. Para-nitrocyclohexyl mono(nitrile carbonate).

13. 2,4-dichlorocyclohexyl mono(nitrile carbonate).